United States Patent
Taubitz et al.

[15] 3,652,887
[45] Mar. 28, 1972

[54] PULSE GENERATOR

[72] Inventors: Bernd Taubitz, Pforzheim; Karl Bachle, Schwieberdingen, both of Germany

[73] Assignee: Robert Bosch GmbH, Stuttgart, Germany

[22] Filed: Oct. 7, 1970

[21] Appl. No.: 78,675

[30] Foreign Application Priority Data

Oct. 8, 1969    Germany.....................P 19 50 647.9

[52] U.S. Cl..............................................310/168, 310/43
[51] Int. Cl........................................................H02k 19/24
[58] Field of Search................310/168, 169, 170, 1, 43, 155; 336/135

[56] References Cited

UNITED STATES PATENTS

| | | | |
|---|---|---|---|
| 973,037 | 10/1910 | Guy | 310/169 |
| 2,643,274 | 6/1953 | Miller | 310/155 X |
| 2,978,599 | 4/1961 | Wilcox | 310/168 |
| 3,566,170 | 2/1971 | Rehklau | 310/168 |

Primary Examiner—D. X. Sliney
Attorney—Michael S. Striker

[57] ABSTRACT

A magnetizable U-shaped core is surrounded by an energized winding so that stray flux is produced at the core ends. A rotary wheel has a circular recess in the region of the core ends in which alternate magnetizable and non-magnetizable parts are fixedly secured so that during rotation of the wheel, the flux passed alternately by said magnetizable and non-magnetizable parts is varied so that pulses are generated in the winding.

9 Claims, 6 Drawing Figures

INVENTORS
Bernd TAUBITZ
Karl BÄCHLE
BY their ATTORNEY

INVENTORS
Bernd TAUBITZ
Karl BÄCHLE
BY
their ATTORNEY

PULSE GENERATOR

BACKGROUND OF THE INVENTION

Tachogenerators are known whose stator includes a winding and a horseshoe magnet having free ends located opposite the periphery of a rotor. Generally, the rotor is a gear consisting of a magnetizable ferromagnetic material which can be temporarily magnetized by a flux. The magnetic flux in the horseshoe core varies in accordance with the position of the ends of the core opposite teeth or recesses of the rotor gear. The manufacture of magnetizable gears of this type is comparatively expensive, since a gear cutting machine tool is required.

SUMMARY OF THE INVENTION

It is the object of the invention to provide a magnetic pulse generator which overcomes the disadvantages of known tachogenerators, and can be inexpensively manufactured.

Another object of the invention is to produce a pulse generator producing pulses at a comparatively high frequency so that it can be used for the measuring of small rotary speeds.

Another object of the invention is to substitute for the teeth and recesses of conventional tachogenerator rotors, alternating magnetizable and non-magnetizable parts arranged in a circle.

With these objects in view, the present invention comprises a stationary means, preferably a core surrounded by an energized winding, and a rotary means preferably including a carrier, and an annular means supported by the carrier in the region of the end portion of the core and of the flux. In accordance with the invention, the annular means includes alternate magnetizable and non-magnetizable parts alternating in circumferential direction of the annular means and causing flux variations so that pulses are generated in the winding.

In the preferred embodiment of the invention, the rotary carrier includes a wheel formed with at least one circular recess, and the alternate magnetizable and non-magnetizable parts are located in the recess fixedly secured to the wheel and form layers alternating in the circumferential direction of the circular recess. The core of the winding is preferably U-shaped and has two end portions located in the region of the circular recess, each of the end portions having a plurality of teeth spaced in the circumferential direction of the circular recess.

It is advantageous to construct the magnetizable and non-magnetizable parts as rectangular plates, and to make the wheel of brass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
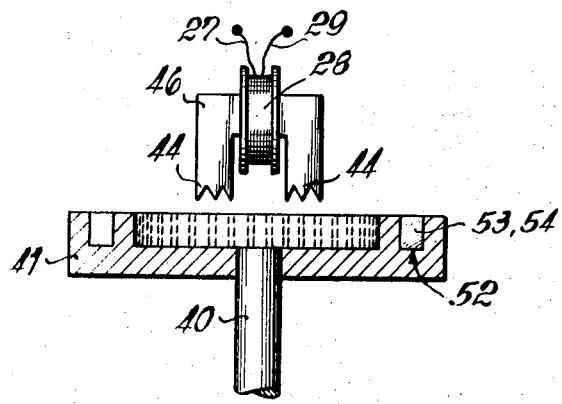
FIG. 1 is a side view partially in axial section illustrating a first embodiment of the invention.

Referring first to the embodiment of FIG. 1, a wheel 41, consisting of a non-magnetizable material, is secured to a rotating shaft 40 whose speed of rotation is to be measured. A circular recess 52 of rectangular cross section is provided in one lateral face of wheel 41. An energized exciting winding 28 with the two leads 27 and 29 surrounds a U-shaped magnetizable core 46. The free ends 44 of core 46 are located opposite portions of the circular recess 52, so that the core 46 extends along a cord of the circle formed by recess 52.

Figure 2A:
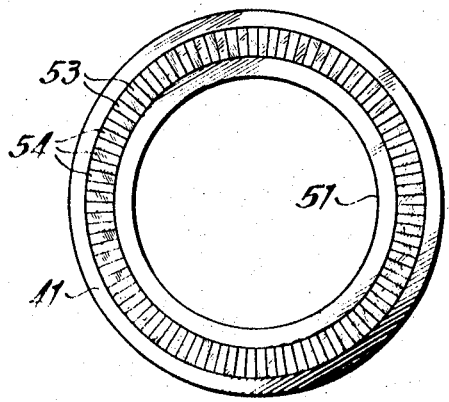
FIG. 2a is a plan view of a rotor wheel used in the embodiment of FIG. 1.
Figure 2B:
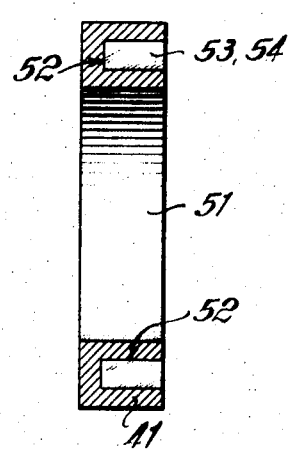
FIG. 2b is an axial sectional view of the rotor wheel.

FIG. 2b illustrates a modification in wheel 41 has a large central opening 51 for receiving a drive shaft corresponding to shaft 40. As shown in FIG. 2a magnetizable plate-shaped parts 53, and non-magnetizable parts 54 alternate in circumferential direction of the circular recess 52, forming alternate layers in the same. The magnetizable layers 53 preferably consist of a temporarily magnetizable ferromagnetic material, and the non-magnetizable layers 54 may advantageously consist of brass.

Figure 2C:
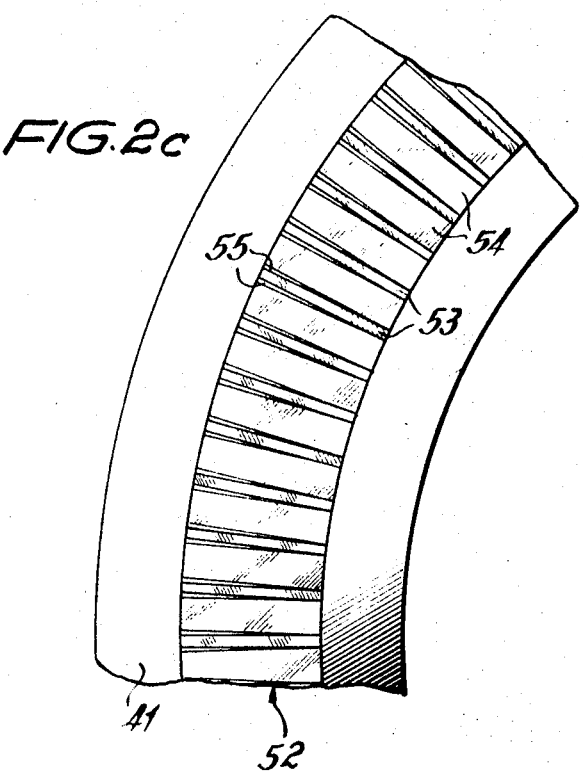
FIG. 2c is a plan view of a portion of the rotor wheel illustrated on an enlarged scale.

As best seen in FIG. 2c, the alternating parts 53 and 54 are rectangular so that wedge-shaped gaps remain between two adjacent rectangular plates 53 and 54, which are filled with a bonding material 55 by which plates 53 and 54 are secured in the annular recess 52. If the material of carrier wheel 41 is a non-magnetizable metal, such as brass, the bonding material 55 is solder, and the non-magnetizable plates 54 preferably consist of the same metal.

If the carrier wheel 41 is molded of a synthetic plastic material, the bonding material 55 is a suitable adhesive. The ferromagnetic plates 53 are advantageously made of the laminate sheets used in dynamo magnetic machines.

Figure 3:
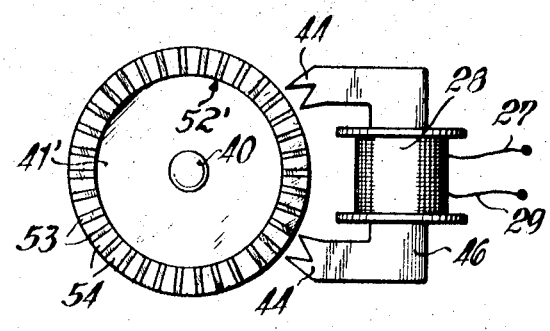
FIG. 3 is a side view, partially in radial section, illustrating another embodiment of the invention.

In the second embodiment illustrated schematically in FIG. 3, the circular recess 52' is formed not in a lateral face of wheel 41', but in the peripheral rim of the same so that the magnetizable and non-magnetizable layers alternate along the entire periphery of wheel 41'. Accordingly, the end portions 44 of the U-shaped magnetizable core 46, are located opposite the periphery of wheel 41', and the alternate plates 53, 54 alternately pass through the stray flux in the region of the end portions 44. In order to increase flux variations, the free ends 44 of core 42 have a plurality of circumferentially spaced teeth, as shown two teeth. The end portions of the core of the embodiment of FIGS. 1 and 4 are constructed in the same manner.

Figure 4:
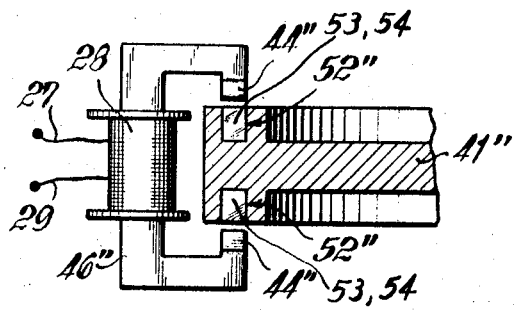
FIG. 4 is a side view, partially in axial section, illustrating another embodiment of the invention.

In the third embodiment illustrated in FIG. 4, the wheel 41" has circular recesses 52" in both lateral faces spaced from the periphery of wheel 41". The core 46" has two arms ending in inwardly projecting core end portions 44" which are located opposite the circular recesses 52"', and the alternating magnetizable and non-magnetizable plates 53, 54 in the same.

In all embodiments of the invention alternating plates or layers of temporarily magnetizable ferromagnetic material, and of non-magnetizable material alternately pass the regions of the free ends of the core which is magnetized by the winding 28. The magnetic flux path of the core remains open, and is not closed by the alternating layers 53, 54. An alternating voltage at a frequency depending on the speed of rotation of wheel 41 is generated in winding 28 due to the fact that the stray flux of core 46 is varied when its free end portion 44 registers with non-magnetic layers 54 instead of with magnetizable layers 53. The initial amplitude of the alternating voltage is consequently somewhat smaller as compared with an arrangement in which a magnetizable armature would connect the end portions of core 46. However, since pulse generators used in tachometric devices with which the present invention is mainly concerned are always provided with an amplifier circuit, the low initial voltage of the generated pulses is immaterial.

The particular advantage of the pulse generator of the invention, and more particularly of the rotor of the same, resides in that the carrier wheel 41 and the plates 53 and 54 can be independently manufactured at low cost, and the plates 53, 54 then quickly assembled in the circular recess 52 by unskilled labor. The carrier wheel 41 is cast of brass, or even more inexpensively molded of a synthetic plastic material to tolerances which are sufficient for the purpose. The circular recess 52 is cast or molded in the same operation in which the wheel 41 is formed.

The small rectangular plates 53 and 54 can be easily mass fabricated by stamping out of a ferromagnetic laminate, and of brass sheet material. Plates 53 and 54 are alternately inserted into the rectangular cross section of recess 52 and secured either by soldering or by applying an adhesive. Since the thickness of plates 53, 54 is constant, very precise pitch of the annular means consisting of alternating plates 53, 54 is obtained, without requiring the expensive milling operation by which gear teeth are formed. It is possible to obtain a very fine pitch of 100 or more magnetizable plates 53, which perform the function of gear teeth in the prior art.

Practical tests have proven that the variations of the stray flux, and thereby the initial voltage is greatest when the thickness of the non-magnetizable plates 54 is substantially four times the thickness of the magnetizable plates 53, as best seen in FIG. 2c.

As noted above, the free core end portions 44 are advantageously provided with at least two teeth of substantially triangular shape which concentrate the stray flux to narrow regions corresponding to the thickness of the plates 53 and 54.

Which of the three embodiments of the invention is used depends on the specific conditions, and may depend on the space available for the device. For producing a high frequency for measuring high rotary speeds, the embodiment of FIGS. 1 and 4 are best suited because the plates 53, 54 bonded to the recess 52, or to the recesses 52'', are retained by the peripheral rim of the rotary wheel against the action of the centrifugal force.

Another advantage of the apparatus of the invention resides in that, after the assembly of the plates 53, 54 in the circular recess, the wheel can be accurately ground to have precisely planar lateral faces, and an exactly circular peripheral surface so that the inserted plates 53, 54 are absolutely flush with the corresponding surfaces of the wheel 41, and do not form any projections on the same.

When the apparatus is used on a motor car, very strong jolts may occur which, due to the construction of the rotor wheel, cannot seriously damage the apparatus since the rotor has no teeth.

It will be understood that each of the elements described above, or two or more together, may also find a useful application in other types of constructions differing from the types described above.

While the invention has been illustrated and described as embodied in a tachometric pulse generator with alternate magnetizable and non-magnetizable plates inserted into a circular recess of a rotary wheel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Pulse generator comprising a rotary carrier rotatable about an axis and including a wheel formed with at least one circular recess having the center in said axis, and an annular means located in said recess and including alternate magnetizable and non-magnetizable parts alternating in circumferential direction of said annular means, said alternate parts being fixedly secured to said wheel and forming layers alternating in the circumferential direction of said circular recess;

and a stationary means including a U-shaped core having two end portions located in the region of said circular recess, each of said end portion having a plurality of teeth spaced in circumferential direction, said stationary means further including a winding for producing in the regions of said end portions a magnetic flux so that flux variations are caused by said alternate magnetizable and non-magnetizable parts during rotation of said carrier whereby pulses are generated in said winding.

2. Pulse generator comprising a rotary carrier rotatable about an axis and including a wheel consisting of a synthetic plastic material and formed with at least one circular recess having the center in said axis, an annular means located in said recess and including alternate magnetizable and non-magnetizable parts alternating in circumferential direction of said annular means, and an adhesive in said recess for securing said magnetizable and non-magnetizable alternate parts fixedly to said wheel for forming layers alternating in the circumferential direction of said circular recess;

and a stationary means including a core having at least one end portion located in the region of said circular recess, and a winding for producing in the region of said end portion a magnetic flux so that flux variations are caused by said alternate magnetizable and non-magnetizable parts during rotation of said carrier whereby pulses are generated in said winding.

3. Pulse generator as claimed in claim 1 wherein said magnetizable parts are rectangular plate-shaped members consisting of a ferromagnetic material.

4. Pulse generator as claimed in claim 1 wherein said non-magnetizable parts are rectangular plate-shaped members consisting of brass.

5. Pulse generator as claimed in claim 1, wherein said layers formed by said non-magnetizable material are substantially four times as thick as said layers formed by said magnetizable material in the circumferential direction of said circular recess.

6. Pulse generator as claimed in claim 1 wherein said wheel and said non-magnetizable parts consist of a non-magnetizable metal; and comprising soldering material in said circular recess for securing said magnetizable and non-magnetizable parts to said wheel.

7. Pulse generator as claimed in claim 1 wherein said wheel consists of a synthetic plastic material; and comprising an adhesive in said circular recess for securing said magnetizable and non-magnetizable parts to said wheel.

8. Pulse generator as claimed in claim 1 wherein said circular recess is formed in a lateral face of said wheel spaced from the periphery of the same; and wherein said end portions of said core are located laterally of said circular recess.

9. Pulse generator as claimed in claim 1 wherein said circular recess is formed in the peripheral rim of said wheel so that said magnetizable and non-magnetizable layers alternate about said peripheral rim; and wherein said end portions of said core are located opposite said peripheral rim.

* * * * *